J. & G. E. WAGGONER.
Harrow.

No. 225,444. Patented Mar. 9, 1880.

WITNESSES:
Donn P. Twitchell
C. Sedgwick

INVENTOR:
J. Waggoner
G. E. Waggoner
BY
ATTORNEYS.

UNITED STATES PATENT OFFICE.

JACOB WAGGONER AND GEORGE E. WAGGONER, OF PERRIN, MISSOURI.

HARROW.

SPECIFICATION forming part of Letters Patent No. 225,444, dated March 9, 1880.

Application filed December 30, 1879.

*To all whom it may concern:*

Be it known that we, JACOB WAGGONER and GEORGE E. WAGGONER, of Perrin, in the county of Clinton and State of Missouri, have invented a new and useful Improvement in Harrows, of which the following is a specification.

Figure 1:
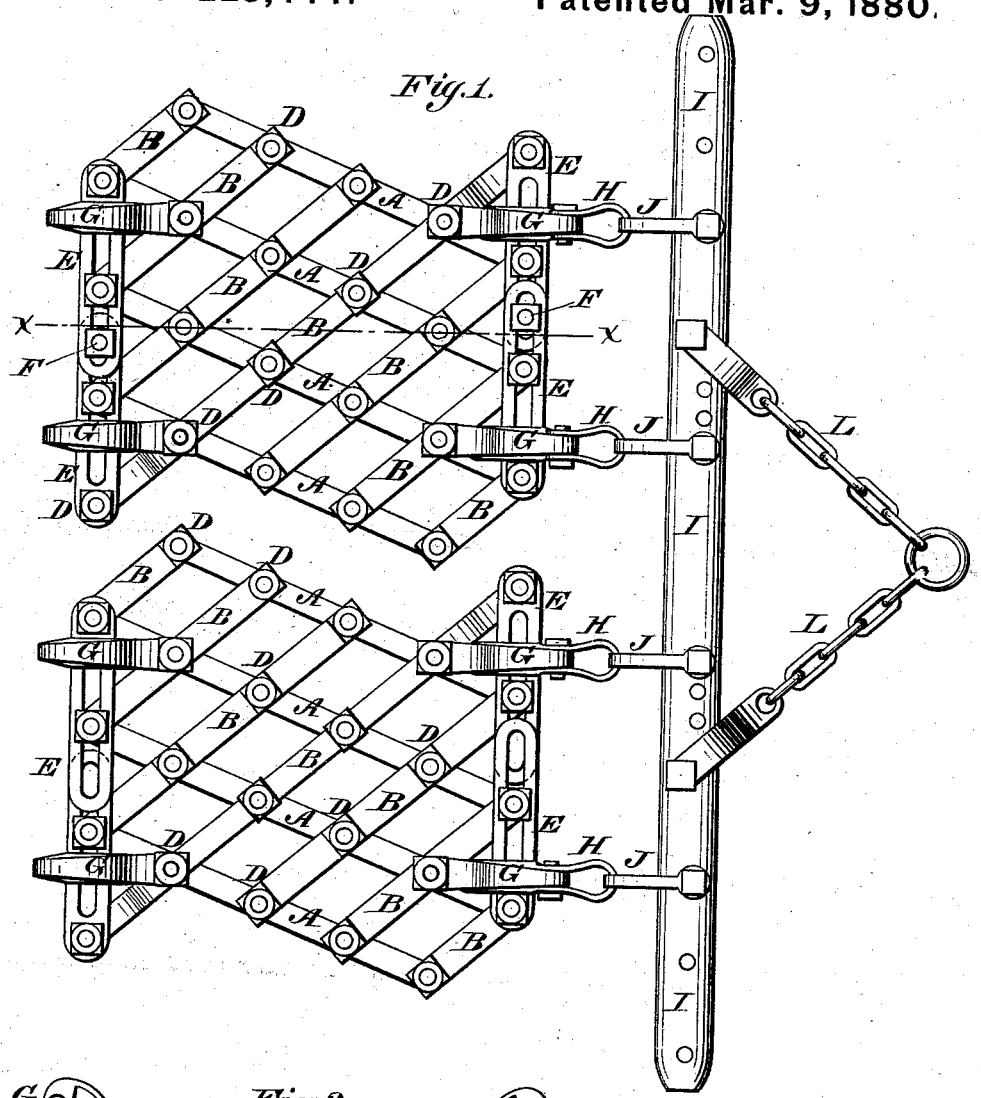
Figure 2:
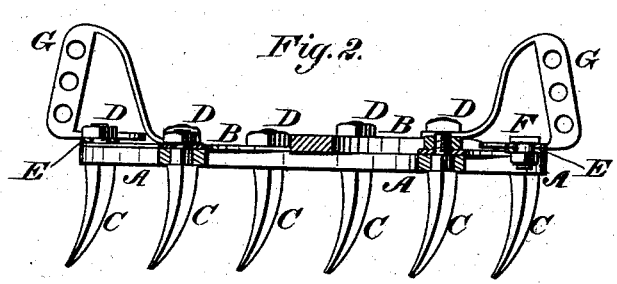
Figure 3:
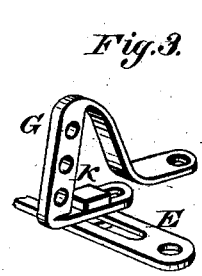

Figure 1 is a plan view of the improvement. Fig. 2 is a sectional side elevation taken through the line $x\ x$, Fig. 1. Fig. 3 is a perspective view of a draft-bracket.

Similar letters of reference indicate corresponding parts.

The object of this invention is to furnish harrows so constructed that they may be adjusted wide or narrow, as the work to be done may require, and will be held securely in place when adjusted.

The harrow-frame is formed of four (more or less) parallel bars, A, and seven (more or less) parallel bars, B, crossing each other diagonally, as shown in Fig. 1, and secured to each other at the points of crossing by the harrow-teeth C.

The central bar B is made of the same thickness as the bars A; but the other bars B may be made thinner. In this case the ends of the central bar B should be made with a slight downward offset, to bring the upper sides of the said ends to a level with the upper sides of the other bars B.

The teeth C are curved, have square shanks formed upon them to fit into square holes in the bars A, and have screw-threads formed upon the upper ends of their shanks to pass through round holes in the bars B and receive the nuts D, by which they are secured in place. To the outer rows of teeth C, at the front and rear ends of the harrow, are secured pairs of bars E, the outer ends of which have holes formed through them to receive the shanks of the outer teeth C.

The middle and inner parts of the bars E are slotted longitudinally to receive the shanks of the inner teeth C, so that the harrow may be made wider or narrower, as the work to be done may require, by loosening the nuts of the said inner teeth and drawing the sides of the harrow apart or pressing them together. The loosened nuts are then tightened and the bars of the frame will be securely locked in place. The inner ends of the bars E may overlap each other, and may have a bolt, F, passed through them to further fasten the parts of the harrow-frame in place.

To each end of the harrow are secured two brackets, G, the vertical parts of which have a number of holes formed through them to receive the clevises H, to which the draft-bar I is connected by other clevises, J, so that the points of draft attachment can be raised and lowered to cause the harrow-teeth C to work deeper or shallower in the ground, as may be required.

The upper parts of the brackets G are curved downward and rearward, and have holes formed through their ends to receive the shanks of harrow-teeth C of the second rows, where they are secured in place by the nuts D of the said teeth C. The lower parts of the brackets G are curved to the rearward, and are slotted longitudinally to receive the bolts K, which also pass through the slots of the bars E, and have nuts screwed upon their lower ends. The brackets G thus assist in giving rigidity to the harrow, while the slots in the lower parts of the said brackets G allow the harrow to be adjusted wider or narrower without removing the bolts K.

The draft-bar I has a number of holes formed through it to receive the bolts of the clevises J, so that the said clevises may be adjusted to correspond with the adjustment of the harrow-frame. To the draft-bar I, upon the opposite sides of and equally distant from its center, are attached the ends of the chain L, to the center of which the draft is applied. With this construction the harrow may be made narrow, so that it can be drawn between rows of plants to cultivate the plants.

Two or more of the harrows may be used together, as shown in Fig. 1, as may be required, an additional horse being required for each additional section.

With this construction, when the harrow is used for loosening the soil, covering seed, and cultivating plants, it is used with the curved points of the teeth C forward; but when used as a smoothing-harrow it is drawn with the curved points of the teeth C rearward.

When the harrow is used with the curved points of the teeth forward the rear brackets, G, may be detached and placed upon the lower side of the bars A B, to serve as gage-runners to limit the depth to which the teeth C enter the ground.

Having thus described our invention, we claim as new and desire to secure by Letters Patent—

1. In a harrow, the combination of the bars A, provided with square holes, the bars B, provided with round holes, and the curved teeth C, having the lower parts of their shanks square and the upper parts round, and provided with screw-threads, substantially as herein shown and described, so that the harrow may be adjusted wider or narrower, as set forth.

2. The draft-brackets G, held on teeth C by nuts D and slotted longitudinally, in combination with the longitudinally-slotted end bars, E, and the nut-held screw-bolts K, as and for the purpose specified.

GEORGE E. WAGGONER.
JACOB WAGGONER.

Witnesses:
G. G. WINSTEAD,
J. W. GLOSSIP.